United States Patent
Christen

Patent Number: 6,105,738
Date of Patent: *Aug. 22, 2000

[54] ELEVATOR BRAKE

[75] Inventor: Jules J. Christen, Rockaway, N.J.

[73] Assignee: Inventio AG, Hergiswil NW, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 09/022,749

[22] Filed: Feb. 12, 1998

[51] Int. Cl.$^7$ .............................. B66B 5/16; F16D 65/24
[52] U.S. Cl. ........................ 188/170; 188/72.3; 303/71
[58] Field of Search .................. 188/170, 72.3, 188/216, 265, 196 M, 196 V; 303/71, 9.76, 15, 72, 68, 74; 92/29, 63, 130 A, 130 B; 187/288, 293

[56] References Cited

U.S. PATENT DOCUMENTS

| | | | |
|---|---|---|---|
| 2,976,085 | 3/1961 | Grogan | 188/170 |
| 3,272,566 | 9/1966 | Clack | 188/170 |
| 3,463,276 | 8/1969 | Brooks, Jr. | 188/170 |
| 3,729,070 | 4/1973 | Le Marchand | 188/216 |
| 3,791,492 | 2/1974 | Neilsen . | |
| 3,802,746 | 4/1974 | Walser | 188/170 |
| 3,858,488 | 1/1975 | Newstead et al. | 188/170 |
| 3,893,549 | 7/1975 | Bennett | 188/170 |
| 3,977,304 | 8/1976 | Meissner | 188/170 |
| 3,982,728 | 9/1976 | Shaw . | |
| 3,985,210 | 10/1976 | Hodge et al. | 188/170 |
| 3,994,206 | 11/1976 | Dahlkvist et al. | 188/170 |
| 4,018,140 | 4/1977 | Engle | 188/170 |
| 4,036,111 | 7/1977 | Dahlkvist et al. . | |
| 4,057,297 | 11/1977 | Beck et al. | 188/170 |
| 4,116,113 | 9/1978 | Leclerc | 188/170 |
| 4,257,494 | 3/1981 | Frankel . | |
| 4,279,332 | 7/1981 | Morgan et al. | 188/170 |
| 4,339,154 | 7/1982 | Duttarer et al. | 303/71 |
| 4,550,811 | 11/1985 | Rumsey | 188/170 |
| 4,552,056 | 11/1985 | McKay | 188/170 |
| 4,586,587 | 5/1986 | Grossi et al. . | |
| 4,645,039 | 2/1987 | Lewis et al. | 188/170 |
| 4,793,449 | 12/1988 | Smith | 188/170 |
| 5,067,593 | 11/1991 | Tanaka et al. . | |
| 5,285,027 | 2/1994 | Nakamura et al. . | |
| 5,353,895 | 10/1994 | Camack et al. . | |
| 5,370,449 | 12/1994 | Edelen et al. | 303/9.76 |
| 5,520,446 | 5/1996 | Wilson et al. | 303/15 |
| 5,648,644 | 7/1997 | Negal . | |
| 5,725,076 | 3/1998 | Pierce et al. | 188/216 |
| 5,779,325 | 7/1998 | Diesel | 188/170 |
| 5,971,109 | 10/1999 | Aulanko et al. . | |

FOREIGN PATENT DOCUMENTS

| | | |
|---|---|---|
| 0 648 703 | 4/1995 | European Pat. Off. . |
| 32 04 695 | 8/1983 | Germany . |
| 440 614 | 7/1967 | Switzerland . |

*Primary Examiner*—Douglas C. Butler
*Attorney, Agent, or Firm*—MacMillan, Sobanski & Todd, LLC

[57] ABSTRACT

An apparatus for braking an elevator includes a storage tank (1) supplying a pressure medium (1.1) under low pressure through a line (2) to a brake cylinder (5) of a brake unit (BE). An adjustable restrictor (3) and a valve (4) are connected in series in the line (2) A piston (10) slides in the brake cylinder (5) between actuated and unactuated positions and has an attached brake lining (6) for engaging a traction sheave (8) of the elevator. A yoke (9) is attached to the brake cylinder (5) and piston pin (11) attached to the piston (10) slides in the yoke. A compression spring (12) acts between the yoke (9) and the piston (10) to move the piston to the actuated position and generate the required force for the braking and holding of the traction disc (8). The valve (4) is opened to release the pressure medium (1.1) from the brake cylinder (5) and allow the spring (12) to move the piston (10) to the actuated position. The piston (10) is returned to the unactuated position by a resetting nut (18) cooperating with the piston pin (11) and the yoke {9). The valve (4) is opened to refill the brake cylinder (5) with the pressure medium (1.1) and subsequently the valve is closed and the resetting nut (18) is released to maintain the piston (10) in the unactuated position.

9 Claims, 3 Drawing Sheets

ELEVATOR BRAKE

BACKGROUND OF THE INVENTION

The present invention relates generally to an apparatus for braking an elevator car consisting of a brake unit with at least one brake cylinder and a slidable piston in the brake cylinder for the braking and holding of the elevator car, where the piston, in the case of braking, can be operated by a spring generating a spring tension and wherein the spring acts against a pressure medium.

In the Swiss patent document CH 440 614, a safety brake for elevators with cable drive is shown, in which the braking force is generated independently of the driving means as, for example, electrical current, compressed air, or pressured oil. The braking force is produced by springs, which work against the force of a brake release cylinder. In the released state of the brake, the brake release cylinder is constantly acted upon by a working fluid. In case of failure of the pressure unit, the spring force alone is active and thus the safety braking is assured.

A disadvantage of this known equipment is the fact that the safety braking force produced by the springs has to be opposed constantly by an at least equally large force produced by the drive means in the brake release cylinder, so that the brake remains released under normal conditions.

SUMMARY OF THE INVENTION

It is here that the brake according to the present invention solves the problem of avoiding the disadvantages of the known equipment by providing a brake in which no action on the brake release cylinder is necessary. The present invention concerns a method for actuating a brake for an elevator car comprising the steps of: providing a brake unit having at least one brake cylinder, a piston slidable in the brake cylinder between an actuated position and an unactuated position and a spring means generating a spring force acting to move the piston in the brake cylinder to the actuated position; connecting a source of the pressure medium to the brake cylinder through a normally closed valve; opening the valve to fill the brake cylinder with the pressure medium and closing the valve to maintain the piston in the unactuated position; releasing the pressure medium from the brake cylinder whereby the spring means moves the piston to the actuated position; resetting the brake unit with a resetting device to move the piston to the unactuated state and opening the valve to refill the brake cylinder with the pressure medium from the source; and closing the valve to prevent discharge of the pressure medium from the brake cylinder and maintain the piston in the unactuated state.

The present invention also concerns a brake for braking and holding an elevator including a brake unit having at least one brake cylinder, a piston slidable in the brake cylinder between an actuated position and an unactuated position and a spring means generating a spring force acting to move the piston to the actuated position for braking and holding an elevator; a resetting device for moving the piston to the unactuated position; and a locking means for retaining the pressure medium in the brake cylinder opposing the spring force of the spring means, the locking means being selectively actuatable to release the pressure medium from the brake cylinder whereby the spring means moves the piston to the actuated position. The resetting device includes a piston pin attached to the piston, which piston pin is slidable in a yoke attached to the brake cylinder, and a resetting nut engaging the piston pin and cooperating with the yoke to move the piston to the unactuated position against the spring force of the spring means. Alternatively, the resetting device can include the piston pin attached to the piston, which piston pin is slidable in the yoke attached to the brake cylinder, and a tension lever cooperating with the yoke and the piston pin to move the piston to the unactuated position against the spring force of the spring means. The locking means includes a relief valve connected between the brake cylinder for selectively releasing the pressure medium to adjust a braking force applied by the piston and the spring means in the actuated position.

The advantages obtained by the present invention are that the brake applied, for example as an emergency brake, can be fitted very easily in existing elevator installations, because it is of simple construction and does not require pressured fluid generating equipment. The installation with a new elevator, or the subsequent installation in an existing elevator, can be based upon existing or newly introduced safety codes or regulations.

It is further advantageous, that the brake according to the present invention can be reset without difficulty after an emergency braking, for example in case of excess velocity or at unauthorized up or down movements of the elevator car with open door.

It is a further advantage of the present invention that the braking force does not act suddenly, whereby a slip of the cable on the drive sheave can be avoided and the elevator passengers are not subject to unpleasant accident causing gravitational forces.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
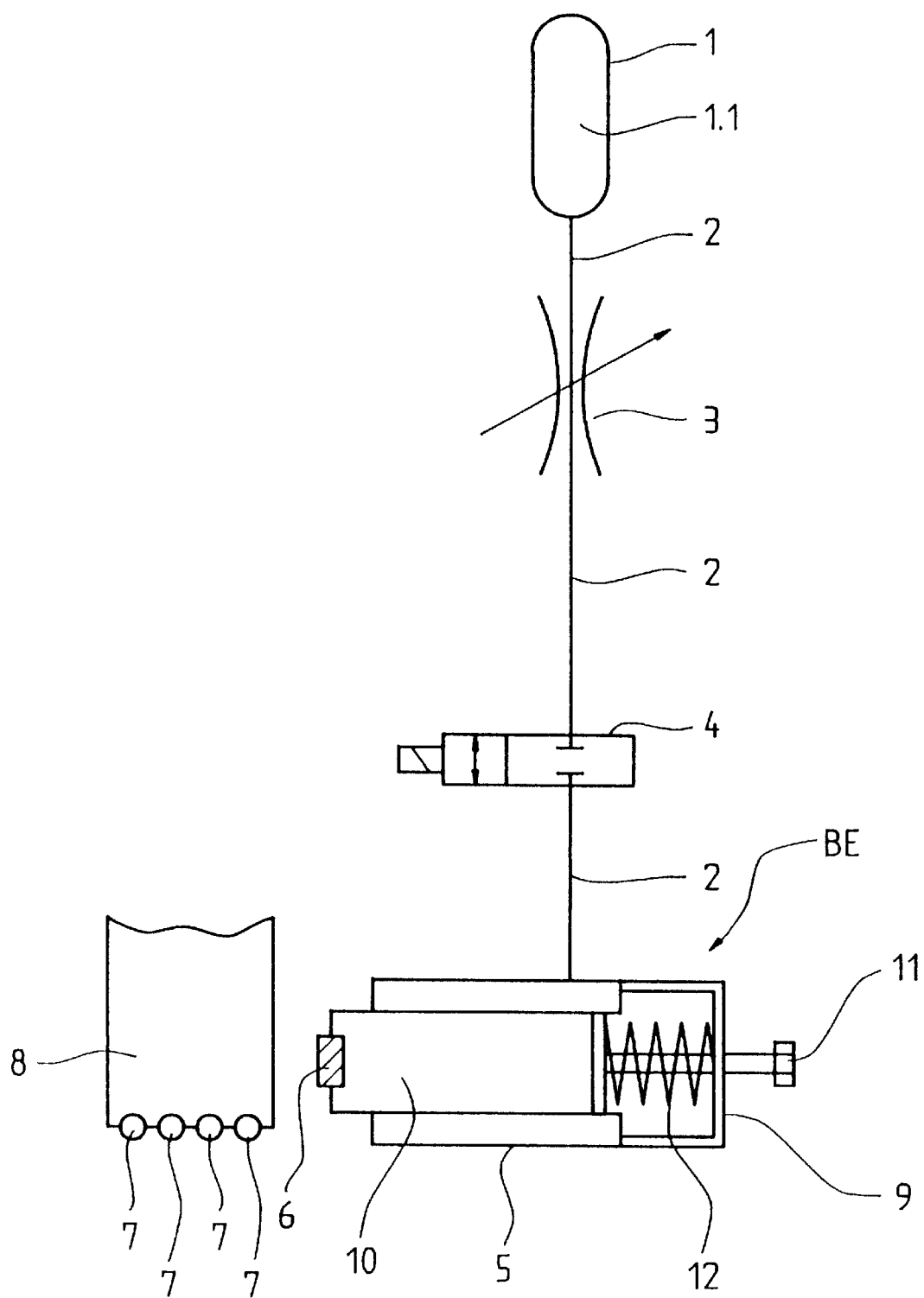
FIG. 1 is a schematic representation of an elevator brake according to the present invention.

There is shown in the FIGS. 1 through 3b a storage tank 1 based on the principle of an expansion tank filled with a pressure medium 1.1 maintained at a relatively low pressure. The pressure medium is carried by means of a line 2 connected between the tank 1 and a brake unit BE. A throttle or adjustable restrictor 3 and a valve 4 are connected in series in the line 2. Shown in the FIG. 1 is, for example, the valve 4 in the form of an electromagnetically actuated bi-directional valve through which the pressure medium 1.1 can flow in either direction. In its switched-off or closed state, as shown, the valve 4 blocks the flow of the pressure medium in the line 2. The brake unit BE includes a brake cylinder 5 which, for example in case of emergency, moves a brake lining 6 to brake and hold a traction sheave 8 guiding cables 7. Attached to the cables 7 are an elevator car (not shown) and a counterweight (not shown). The brake lining 6 can, for example, also act upon a separate brake disc (not shown) or upon the cables 7. Mounted on the brake cylinder 5 is a yoke 9 which carries a piston pin 11 attached to one end of a piston 10 slidably retained in a chamber of the brake cylinder. The brake lining 6 is attached to an end of the piston 10 opposite the piston pin 11. A spring means such as a compression spring 12 surrounds the piston pin 11 and acts between the yoke 9 and the piston 10 to generates the required force for the braking and holding of the traction sheave 8 (or of a brake disc). The brake unit BE is shown in the released or unactuated state in the FIG. 1. Actuation and release of the brake is explained in more detail below.

Figure 2:
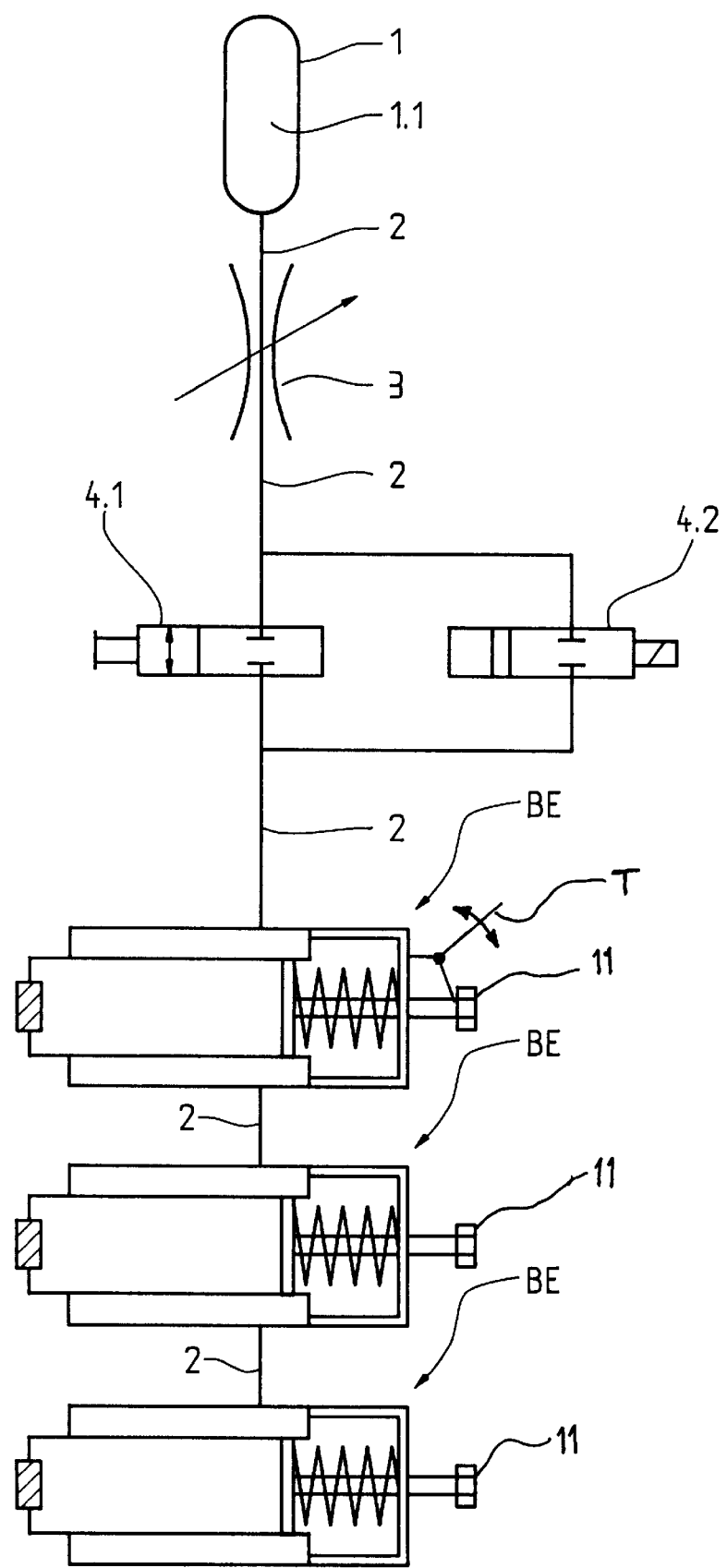
FIG. 2 is a schematic representation of the brake shown in the FIG. 1 with multiple brake units and a brake resetting means.

Instead of the valve 4 with two flow directions, it is possible to provide, as shown in the FIG. 2 for example, a manually actuated valve 4.1 with a first flow through direction and an adjustable, for instance electromagnetically actuated, relief valve 4.2 with a second opposite flow through direction. By means of the relief valve 4.2, it is possible to adjust the value of the braking force, so that the braking force does not occur instantaneously and an acceptable deceleration is created for the elevator car and the counterweight. The valves 4, 4.1, 4.2 function as a locking means for maintaining the piston 10 in the unactuated position.

Depending on the required braking force, it is possible, also as shown in the FIG. 2, for the brake to include two or more of the brake units BE, which units are connected in series with the supply tank 1 of the pressure medium 1.1. Alternatively, the brake units BE can be connected in parallel (not shown) to the supply of the pressure medium 1.1.

Figure 3A:
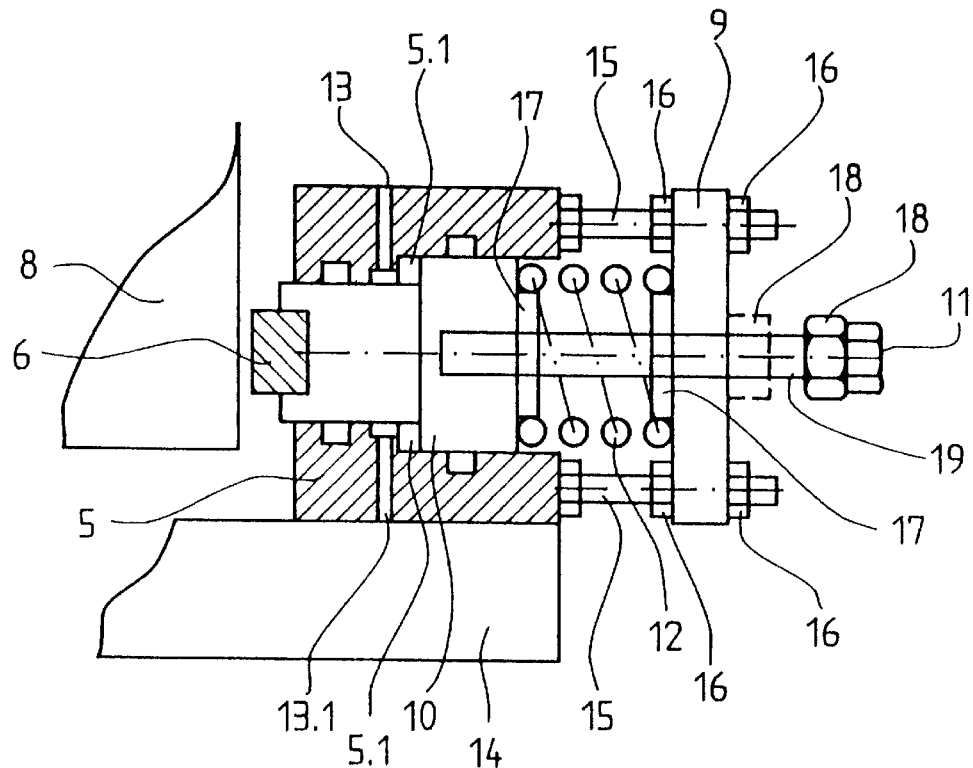
FIG. 3a is a cross-sectional view of the brake unit shown in the FIG. 1 with a released or unactuated brake and an alternate embodiment brake resetting means.
Figure 3B:
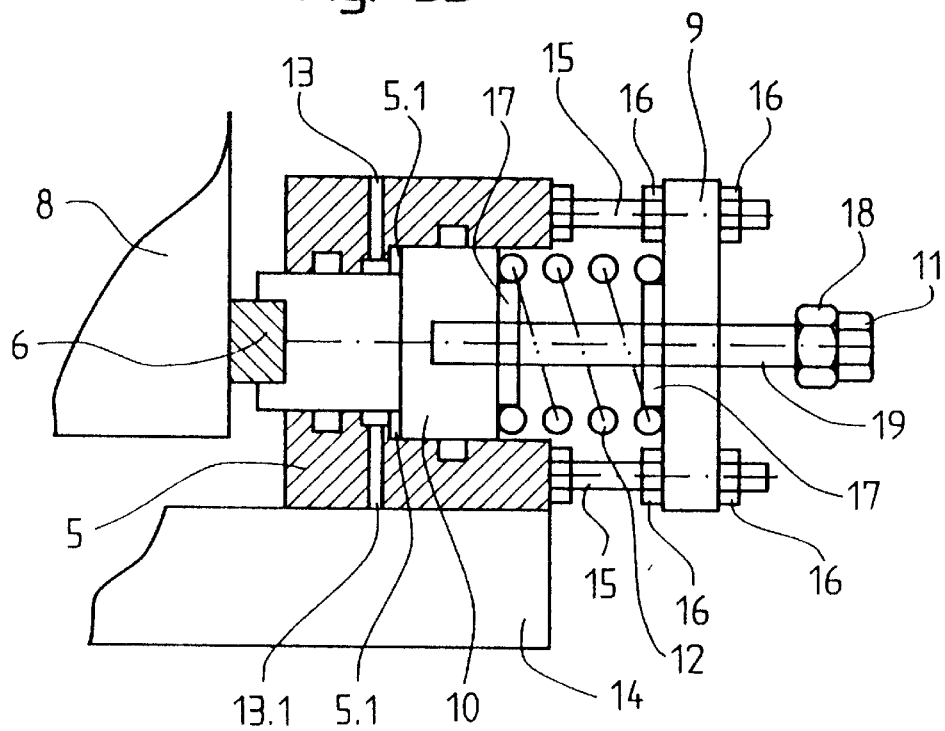
FIG. 3b is a view similar to the FIG. 3a with the brake unit actuated under a braking condition.

The FIGS. 3a and 3b show details of the brake unit BE in the unactuated (released) and actuated states respectively. The line 2 is connected to a first port 13 of the brake cylinder 5, which cylinder is mounted on a solid frame 14 of the elevator drive. In case several of the brake units BE are used, it is possible to connect the first port 13.1 of another brake unit BE to a second port 13.1 of the brake cylinder 5. The pressure medium 1.1 supplied through the line 2 fills a cylinder chamber 5.1 formed in the cylinder 5 and in fluid communication with the ports 13 and 13.1. The yoke 9 is carried by yoke bolts 15 attached to the brake cylinder 5 and is secured by means of nuts 16 threadably engaging the yoke bolts.

For centering the compression spring 12, a separate seat or disc 17 is attached to each of the piston 10 and the yoke 9. A resetting nut 18 can rotate on a screw thread 19 formed on the piston pin 11. For resetting of the brake unit BE, the resetting nut 18 is moved into the position shown in broken line in the FIG. 3a.

Instead of and the resetting nut 18, it is for example possible to use a tension lever, by means of which the piston 10 can be reset against the spring force of the compression spring 12, and which for example after resetting can be removed and which can be used for the resetting of further brake units BE. The tension lever can be operated manually or by means of an energy source. Such a tension lever T is shown in the FIG. 2 removably mounted on one of the brake units BE and engaging the piston pin 11. When the brake is actuated, the piston pin 11 rotates the lever T in a clockwise direction under urging by the spring 12 and then the lever can be rotated in a counterclockwise direction to reset the brake.

The brake is actuated by opening the valve 4 (FIG. 1) or the relief valve 4.2 (FIG. 2) to allow pressure fluid 1.1 to flow from the cylinder chamber 5.1 to the expansion tank 1 as the compression spring 12 moves the piston 10 toward the traction sheave 8 to an actuated position. After a brake application, the brake unit BE is in the actuated state shown in the FIG. 3b. The brake lining 6 abuts the traction sheave 8 where the full spring force of the compression spring 12 exerts a maximal braking force, dependent on the coefficient of friction between the brake lining and the traction sheave. By the displacement of the piston 10, the cylinder chamber 5.1 has assumed a minimal volume.

The resetting of the brake to the unactuated state is carried out in the following manner. The valve 4 (or the valve 4.1) is opened and a release valve (not shown) connected to the second port 13.1 is opened. By means of the resetting nut 18 acting on the yoke 9 and the screw thread 19, as shown in broken line in the FIG. 3a, the piston pin 11 and the piston 10 are moved away from the traction sheave 8 against the spring force of the compression spring 12 to an unactuated position. Thereby, the volume of the cylinder chamber 5.1 enlarges and is filled with the pressure medium 1.1 flowing from the storage tank 1. After the piston 10 has been brought into its terminal position, the valve 4 (or the valve 4.1) is closed to prevent flow in the line 2 and the not shown release valve is closed. The resetting nut 18 is rotated back into its starting position. The spring force of the compression spring 12 now acts on the pressure medium 1.1 filling the cylinder chamber 5.1 which maintains the piston 10 and the brake lining 6 in the reset unactuated position shown in the FIG. 3a.

If braking is required, for instance in response to excess velocity of the elevator car, or unauthorized up or down movements of the elevator car with an open door, the valve 4 (or the release valve 4.2) is opened. The pressure medium 1.1 can now flow back into the storage tank 1 by way of the valve 4 (or the valve 4.2) and the line 2. The piston 10 with the brake lining 6 moves under the action of the spring force of the compression spring 12 into the position shown in the FIG. 3b in which the traction sheave 8 is braked and held from rotation.

In summary, the present invention relates to a method for actuating a brake for an elevator car comprising the steps of: a. providing the brake unit BE having at least the one brake cylinder 5, the piston 10 slidable in the brake cylinder between the actuated position and the unactuated position and the spring means 12 generating the spring force acting to move the piston in the brake cylinder to the actuated position; b. connecting the source 1 of the pressure medium 1.1 to the brake cylinder 5 through the normally closed valve 4, 4.1, 4.2; c. opening the valve to fill the brake cylinder 5 with the pressure medium 1.1 and closing the valve to maintain the piston 10 in the unactuated position; d. releasing the pressure medium 1.1 from the brake cylinder 5 whereby the spring means 12 moves the piston 10 to the actuated position; e. resetting the brake unit BE with the resetting device 9, 11, 18 to move the piston 10 to the unactuated state and opening the valve 4, 4.1 to refill the brake cylinder 5 with the pressure medium 1.1 from the source 1; and f. closing the valve 4, 4.1 to prevent discharge of the pressure medium 1.1 from the brake cylinder 5 and maintain the piston 10 in the unactuated state. The step d. can be performed by opening the valve 4, 4.2 permitting the discharge of the pressure medium 1.1 from the brake cylinder 5 to the source 1.

The present invention also relates to a brake for braking and holding an elevator including: the brake unit BE having at least the one brake cylinder 5, the piston 10 slidable in the brake cylinder between the actuated position and the unactuated position and the spring means 12 generating the spring force acting to move the piston to the actuated position for braking and holding an elevator; the resetting device 9, 11, 18 for moving the piston 10 to the unactuated position; and the locking means 4, 4.1, 4.2 for retaining the pressure medium 1.1 in the brake cylinder 5 opposing the spring force of the spring means 12, the locking means being selectively actuatable to release the pressure medium from the brake cylinder whereby the spring means moves the piston 10 to the actuated position. The resetting device includes the piston pin 11 attached to the piston 10, which piston pin is slidable in the yoke 9 attached to the brake cylinder 5, and the resetting nut 18 engaging the piston pin and cooperating with the yoke to move the piston to the unactuated position against the spring force of the spring means 12. Alternatively, the resetting device can include the piston pin 11 attached to the piston 10, which piston pin is slidable in the yoke 9 attached to the brake cylinder 5, and the tension lever cooperating with the yoke and the piston pin to move the piston to the unactuated position against the spring force of the spring means 12. The locking means 4, 4.1, 4.2 includes the relief valve 4.2 connected between the brake cylinder 5 for selectively releasing the pressure medium 1.1 to adjust a braking force applied by the piston 10 and the spring means 12 in the actuated position.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake for braking and holding an elevator comprising:
    an expansion tank containing a pressure medium;
    a brake unit having at least one brake cylinder, a piston slidable in said brake cylinder between an actuated position and an unactuated position, a spring means generating a spring force acting to move said piston to said actuated position for braking and holding an elevator, and a yoke attached to said brake cylinder;
    a resetting means for moving said piston to said unactuated position, said resetting means including a piston pin attached to said piston and slidable in said yoke and a manually actuatable resetting device engaging said piston pin on an opposite side of said yoke from said piston whereby manual actuation of said resetting device moves said piston to said unactuated position against said spring force of said spring means and release of said resetting device releases said piston for movement by said spring means to said actuated position; and
    a valve means connected between said expansion tank and said brake cylinder whereby when said valve means is open and said piston is moved to said unactuated position by said resetting device, said pressure medium flows into said brake cylinder and is trapped in said brake cylinder when said valve means is closed, and whereby when said resetting device is released, said valve means is selectively actuatable to release said trapped pressure medium from said brake cylinder and said spring means moves said piston to said actuated position.

2. The brake according to claim 1 wherein said resetting device includes a resetting nut threadably engaging said piston pin and cooperating with said yoke to move said piston to said unactuated position against said spring force of said spring means.

3. The brake according to claim 1 wherein said resetting device includes a tension lever removably mounted on said piston pin and cooperating with said yoke to move said piston to said unactuated position against said spring force of said spring means.

4. The brake according to claim 1, wherein said valve means includes a bi-directional valve connected between said expansion tank and said brake cylinder for selectively permitting said pressure medium to flow into said brake cylinder from said expansion tank and for selectively releasing said pressure medium from said brake cylinder to said expansion tank to adjust a braking force applied by said piston and said spring means in said actuated position.

5. The brake according to claim 1 wherein said valve means includes a first valve connected between said expansion tank and said brake cylinder with a first flow through direction from said expansion tank to said brake cylinder and a second valve connected between said expansion tank and said brake cylinder in parallel with said first valve with a second flow through direction opposite said first flow through direction.

6. The brake according to claim 1 wherein said pressure medium in said expansion tank is at a relatively low pressure insufficient to overcome said spring force.

7. A brake for braking and holding an elevator comprising:
    at least one brake unit having a brake cylinder, a piston slidable in said brake cylinder between an actuated position and an unactuated position, a spring means generating a spring force acting to move said piston to said actuated position for braking and holding an elevator, and a yoke attached to said brake cylinder;
    a resetting means for moving said piston to said unactuated position, said resetting means including a piston pin attached to said piston and slidable in said yoke and a manually actuatable resetting device engaging said piston pin on an opposite side of said yoke from said piston whereby manual actuation of said resetting device moves said piston to said unactuated position against said spring force of said spring means and release of said resetting device releases said piston for movement by said spring means to said actuated position;
    an expansion tank containing a pressure medium insufficient to overcome said spring force; and
    a valve means connected between said expansion tank and said brake cylinder whereby when said valve means is open and said piston is moved to said unactuated position by said resetting device, said pressure medium flows into said brake cylinder and is trapped in said brake cylinder when said valve means is closed, and whereby when said resetting device is released, said valve means is selectively actuatable to release said trapped pressure medium from said brake cylinder and said spring means moves said piston to said actuated position.

8. A method for actuating and resetting a brake unit for an elevator car comprising the steps of:
    a. providing a brake unit having a brake cylinder, a piston slidable in the brake cylinder between an actuated position and an unactuated position, a manual resetting device engaged with the piston and a spring means generating a spring force acting to move the piston in the brake cylinder to the actuated position;

b. connecting a source of a pressure medium to the brake cylinder through a normally closed valve;

c. manually applying a resetting force to the manual resetting device thereby moving the piston to the unactuated state and compressing the spring means;

d. opening the valve to fill the brake cylinder with the pressure medium from the source while maintaining the manually applied resetting force;

e. closing the valve to prevent discharge of the pressure medium from the brake cylinder and releasing the resetting force from the manual resetting device to maintain the piston in the unactuated state and the spring means compressed; and f. releasing the pressure medium from the brake cylinder whereby the spring means moves the piston to the actuated position.

9. The method according to claim 8 wherein said step f. is performed by opening the valve permitting the discharge of the pressure medium from the brake cylinder to the source.

* * * * *